United States Patent [19]

Schuppiser et al.

[11] Patent Number: 4,542,182
[45] Date of Patent: Sep. 17, 1985

[54] LATICES OF VINYL ACETATE/OLEFIN COPOLYMERS

[75] Inventors: Jean-Luc Schuppiser, Claye Souilly; Jean-Claude Daniel, Fontenay-Sous-Bois, both of France

[73] Assignee: Rhone-Poulenc Specialties Chimiques, France

[21] Appl. No.: 405,599

[22] Filed: Aug. 5, 1982

[30] Foreign Application Priority Data

Oct. 8, 1981 [FR] France ................. 81 15439

[51] Int. Cl.$^4$ ............................................. C08F 18/08
[52] U.S. Cl. ..................................... 524/563; 524/377; 524/535; 524/559; 524/561
[58] Field of Search ............... 524/377, 559, 560, 561, 524/563, 564

[56] References Cited

FOREIGN PATENT DOCUMENTS 1180133 10/1964 Fed. Rep. of Germany .
74536 7/1978 Japan ................. 524/458
1139202 1/1969 United Kingdom .

Primary Examiner—Christopher A. Henderson
Attorney, Agent, or Firm—Finnegan, Henderson, Farabow, Garrett & Dunner

[57] ABSTRACT

Latices of particles of vinyl acetate/olefin copolymers. The particles have an average diameter between 0.05 and 1 $\mu$M. The copolymers have a glass transition temperature between $-30°$ and $50°$ C. The particles are present in the latices in a concentration between 10 and 70% by weight. The latices contain a protective colloid comprising a water-soluble polymer (a) containing at least one monomer selected from the group consisting of N-methylolacrylamide and N-methylolmethacrylamide and a water-soluble polymer (b) of ethylene glycol, wherein polymer (b) has a molecular weight of between 1,000 and 50,000.

The latices are prepared by polymerization in aqueous emulsion, in the presence of an initiator and the above-described protective colloid.

The latices may be applied as binders in the manufacture of paints, glues, paper, textiles, floor coverings and mortar additives.

6 Claims, No Drawings

LATICES OF VINYL ACETATE/OLEFIN COPOLYMERS

The invention relates to latices of vinyl acetate/olefin copolymers and also to a process for the preparation of the latices.

Latices of vinyl acetate/olefin copolymers, which are prepared by the polymerization of vinyl acetate and an olefin in aqueous emulsion, are generally used as binders in the manufacture of glues, paints, textiles, paper and the like. Such applications require latices which are stable during both storage and handling, and which also possess a certain viscosity and yield water-insensitive films. Disadvantageously, previously known latices of vinyl acetate/olefin copolymers do not simultaneously possess all of the desired properties. Specifically, latices obtained by polymerization without protective colloids give films having a good water resistance, but possessing an undesirably low viscosity. The presence of carboxyl groups in the copolymer facilitates improvement in viscosity; however, viscosity can still vary with the pH of the latex.

On the other hand, latices obtained by polymerization in the presence of protective colloids, such as cellulose ethers, polyvinyl alcohols or polyvinylpyrrolidone, possess a satisfactory viscosity, irrespective of their pH, but yield extremely water-sensitive films. Moreover, during the preparation of the latices, the viscosity of the polymerization medium interferes with stirring, heat exchange, transfer and filtration.

The copolymer latices of the present invention do not have these disadvantages. Rather, they simultaneously possess all the properties necessary for desired applications and are easily prepared.

The latices of vinyl acetate/olefin copolymers according to the invention comprise particles of a vinyl acetate/olefin copolymer, the copolymer having a glass transition temperature between $-30°$ and $50°$ C. and the particles being present in the latex in a concentration between 10 and 70% by weight and having an average diameter between 0.5 and 1 $\mu$m. The latices also contain a protective colloid comprising a water-soluble polymer (a) containing at least one monomer selected from the group consisting of N-methylolacrylamide and N-methylolmethacrylamide and a water-soluble polymer (b) of ethylene glycol, the polymer having a molecular weight between 1,000 and 50,000.

As will be explained in greater detail hereafter, for a given concentration, the low viscosity at acid pH of the latices of the present invention advantageously becomes high at alkaline pH and then remains invariable, irrespective of the pH. Further, the latices advantageously yield water-insensitive copolymer films.

Vinyl acetate/olefin copolymers are understood to be copolymers of vinyl acetate with at least one olefin, preferably possessing 2 to 4 carbon atoms, such as ethylene, propylene or butenes, and also copolymers of vinyl acetate with at least one olefin and at least one other copolymerizable monomer, which optionally may be grafted onto the vinyl acetate/olefin copolymer. The at least one other copolymerizable monomer is selected from amongst (a) the vinyl esters of branched or unbranched, saturated monocarboxylic acids having from 1 to 12 carbon atoms, such as vinyl propionate, "Versatate" (registered trademark for vinyl esters of branched $C_9$-$C_{11}$ acids), vinyl pivalate and vinyl laurate, (b) the alkyl esters of unsaturated monocarboxylic or dicarboxylic acids possessing 3 to 6 carbon atoms, in which the alkyl moiety possesses 1 to 10 carbon atoms, such as methyl, ethyl, butyl and ethylhexyl acrylates, methacrylates, maleates and fumarates, (c) vinyl halides, such as vinyl chloride, and (d) vinylidene halides, such as vinylidene chloride.

In the latex, the concentration of copolymer particles is between 10 and 70%, preferably, between 35 and 65%, by weight. The particles have an average diameter between 0.05 and 1 $\mu$m and their size distribution can be broad or narrow, depending on the polymerization conditions used. The copolymers possess a glass transition temperature between $-30°$ and $50°$ C., preferably, between $-20°$ and $35°$ C.

In the latex of vinyl acetate/olefin copolymer, the protective colloid represents 0.1 to 5%, preferably, 0.5 to 3%, by weight, of the copolymer and is formed of 15 to 70% by weight of the water-soluble polymer (a) and 30 to 85% by weight of the water-soluble polymer (b) of ethylene glycol.

Polymer (a) of the protective colloid is understood to be (a) at least one homopolymer containing a monomer selected from the group consisting of N-methylolacrylamide and N-methylolmethacrylamide; (b) at least one copolymer of N-methylolacrylamide and N-methylolmethacrylamide in any proportions; or (c) at least one copolymer containing at least one monomer selected from the group consisting of N-methylolacrylamide and N-methylolmethacrylamide and further containing at least one monomer selected from the group consisting of acrylamide, methacrylamide, the N-alkyl derivatives of either acrylamide or methacrylamide, either in which the alkyl group possesses 1 to 4 carbon atoms and may be substituted by amine groups or alkoxy groups possessing 1 to 4 carbon atoms, or in which the alkyl group possesses 2 to 4 carbon atoms and is substituted by a hydroxyl group. Specifically, monomers which may be copolymerized with N-methylolacrylamide and/or N-methylolmethacrylamide include acrylamide, methacrylamide, N-methylacrylamide, N-N-dimethylacrylamide, N-isopropylacrylamide, N-methylaminoisopropylacrylamide, N-methoxymethylacrylamide and N-isobutoxymethylacrylamide. In these copolymers, the acrylamide or methacrylamide represents at most 90% by weight of the copolymer. Further, polymer (a) may be mixtures of the above-defined homopolymers and copolymers.

Polymer (b) of the protective colloid is understood to be (a) at least one homopolymer of ethylene glycol; or (b) at least one copolymer of ethylene glycol and at least one monomer selected from the group consisting of propylene glycol and butylene glycol, in which the proportion of ethylene glycol is at least 70% by weight. Further, polymer (b) includes mixtures of these homopolymers and copolymers. Of course, the mixtures of these homopolymers and copolymers may include homopolymers and copolymers of different molecular weight. These homopolymers and copolymers of ethylene glycol possess molecular weights between 1,000 and 50,000, preferably, between 3,000 and 35,000.

The latices of the present invention which have an acid pH after their preparation possess a low viscosity, making them easier to handle. As soon as the pH of the latex becomes alkaline, as, for example, through the addition of an alkaline solution, the viscosity increases until it reaches a maximum, whereafter the viscosity stabilizes and remains invariable, irrespective of the pH. The maximum viscosity of a particular latex is a function of the nature of the protective colloid and the concentration thereof in the latex. The time taken to reach the maximum viscosity is a function of the value of the alkaline pH. The closer the pH is to neutrality, the longer is the time required to reach maximum viscosity.

If, for any reason, it is undesirable to reach the maximum viscosity of the latex, it is possible to stop the increase in the viscosity and to stabilize the viscosity by bringing the latex back to acid pH, for example, by adding an acid solution. Making the latex alkaline again causes the increase in the viscosity to resume and continue to a value near the maximum.

The process of the present invention for the preparation of the latices of vinyl acetate/olefin copolymers comprises polymerizing vinyl acetate with at least one olefin and, if appropriate, at least one other copolymerizable monomer, in aqueous emulsion, in the presence of an initiator and a protective colloid. In this process, the protective colloid comprises the water-soluble polymer (a) and the water-soluble polymer (b) of ethylene glycol.

As explained above, the olefins which can be copolymerized with the vinyl acetate preferably possess 2 to 4 carbon atoms, such as ethylene, propylene and the butenes.

As explained above, other copolymerizable monomers are the vinyl esters of branched or unbranched, saturated monocarboxylic acids having from 1 to 12 carbon atoms, such as vinyl propionate, "Versatate" (registered trademark for vinyl esters of branched $C_9$–$C_{11}$ acids), vinyl pivalate and vinyl laurate, and/or the alkyl esters of unsaturated monocarboxylic or dicarboxylic acids possessing 3 to 6 carbon atoms, in which the alkyl moiety possesses 1 to 10 carbon atoms, such as methyl, ethyl, butyl and ethylhexyl acrylates, methacrylates, maleates and fumarates, and/or vinyl and vinylidene halides, such as vinyl chloride and vinylidene chloride.

These other copolymerizable monomers (comonomers) can be polymerized with the vinyl acetate and at least one olefin, or, alternatively, can be grafted onto the vinyl acetate/olefin copolymer.

The olefins and other comonomers are used in amounts such that the glass transition temperature of the vinyl acetate/olefin copolymer obtained is between −30° and 50° C., preferably, between −20° and 35° C.

Depending on the process, as will be recognized by those of ordinary skill in the art, the monomers may be introduced into the polymerization medium, under pressure if the monomer is gaseous, either in total before polymerization or in successive portions or continuously during polymerization, or in part before polymerization, with the other part being introduced in successive portions or continuously during polymerization.

Depending on the particular polymer to be obtained, as will be recognized by those of ordinary skill in the art, it is possible to add a crosslinking monomer and/or a transfer agent to the monomers.

The crosslinking monomer, which is used in proportions of between 0 and 10%, preferably, between 0 and 3%, by weight, relative to all of the monomers to be copolymerized in the polymerization medium, is represented more particularly by vinyl acrylate and methacrylate, divinyl ether, mono- or poly-(alkylene ($C_2$–$C_4$) glycol) acrylates and methacrylates, allyl phthalate, triallyl cyanurate, tetraallyloxyethane, alkali metal diallylsulfosuccinates, and condensates of unsaturated carboxylic acids ($C_3$–$C_5$) with polyols, such as, for example, trimethylolpropane acrylate and methacrylate.

The transfer agent, which is used in proportions of between 0 and 10, preferably, between 0 and 3%, by weight, relative to all the monomers to be copolymerized in the polymerization medium, is represented, inter alia, by halogenohydrocarbons such as methylene chloride, chloroform, carbon tetrachloride, bromoform, carbon tetrabromide, dichloroethane and trichloroethane; aliphatic alcohols having 1 to 4 carbon atoms, such as methyl alcohol and allyl alcohol; and, preferably, mercaptans, such as laurylmercaptan, dodecylmercaptan and aminophenylmercaptan.

The crosslinking monomer and/or the transfer agent are introduced into the reaction medium by themselves or in a mixture, in any known manner, before or during polymerization. For example, the crosslinking monomer and/or the transfer agent may be introduced at the same time as the monomers to be copolymerized or at the same time as one of the monomers, either simultaneously or, more particularly, in solution in one of the monomers or in solution in a mixture of the monomers.

The concentration of monomers to be copolymerized in the polymerization medium is advantageously between 10 and 70% by weight.

The initiator used in effecting polymerization is a conventional water-soluble initiator for polymerization in emulsion. More particularly, hydrogen peroxide, alkali metal persulfates, water-soluble diazo derivatives, redox systems based on oxidizing agents, such as hydrogen peroxide and organic peroxides or hydroperoxides, and reducing agents, such as alkali metal sulfites and bisulfites, amines, hydrazine and metal formaldehydesulfoxylates, may be used. The initiator is used in proportions of the order of 0.05 to 4.5%, preferably, 0.1 to 2%, by weight of the monomers to be copolymerized. The initiator is introduced into the polymerization medium in total before polymerization or in successive portions or continuously during polymerization, or alternatively in part before polymerization, the other part being added in successive portions or continuously during polymerization. The latter alternative is especially appropriate if the life of the initiator at the polymerization temperature is short.

The protective colloid to be used in the process comprises two constituents: the water-soluble polymer (a) and the water-soluble polymer (b) of ethylene glycol, both of which have been described above.

As described above, polymer (a) is (a) at least one homopolymer containing a monomer selected from the group consisting of N-methylolacrylamide and N-methylolmethacrylamide; (b) at least one copolymer of N-methylolacrylamide and N-methylolmethacrylamide in any proportions; or (c) at least one copolymer containing at least one monomer selected from the group consisting of N-methylolacrylamide and N-methylolmethacrylamide and further containing at least one monomer selected from the group consisting of acrylamide, methacrylamide, the N-alkyl derivatives of either acrylamide or methacrylamide, either in which the alkyl group possesses 1 to 4 carbon atoms and may be substituted by amine groups or alkoxy groups possessing 1 to 4 carbon atoms, or in which the alkyl group possesses 2 to 4 carbon atoms and is substituted by a hydroxyl group. Specifically, monomers which may be copolymerized with N-methylolacrylamide and/or N-methylolmethacrylamide include acrylamide, methacrylamide, N-methylacrylamide, N-N-dimethylacrylamide, N-isopropylacrylamide, N-methylaminoisopropylacrylamide, N-methoxymethylacrylamide and N-isobutoxymethylacrylamide. In these copolymers, the acrylamide or methacrylamide represents at most 90% by weight of the copolymer. Further, polymer (a) may be mixtures of these homopolymers and copolymers.

The homopolymers and copolymers of polymer (a) can be prepared, for example, by polymerizing the monomer(s) at a concentration of 0.1 to 7% by weight, in aqueous solution, at a temperature between 0° and 90° C. in the presence of an initiator selected from the group consisting of a water-soluble free-radical initiator, ultraviolet rays and a combination thereof.

The initiator to be used in the polymerization of polymer (a) may be a conventional water-soluble free-radical initiator for polymerization in solution, such as hydrogen peroxide, alkali metal persulfates, water-soluble diazo derivatives, or redox systems based on oxidizing agents, such as hydrogen peroxide and organic peroxides or hydroperoxides, and reducing agents, such as alkali metal sulfites and bisulfites, amines, hydrazine, metal formaldehydesulfoxylates and the like. All these initiators are used by themselves or in a mixture, in amounts of 0.1 to 10% by weight of the monomer(s).

These homopolymers and copolymers of polymer (a) may be crosslinked by amounts, ranging up to 50% by weight of the monomer(s) of water-soluble crosslinking agents such as N,N'-$C_1$-$C_4$-alkylidene-bis-($C_3$-$C_5$-unsaturated acid amides), specifically, N,N'-methylene-bis-(acrylamide) and N,N'-methylene-bis-(methacrylamide), diallyl ether, diallyl sulfosuccinate and polyallyloxyethane.

As described above, polymer (b) is (a) at least one homopolymer of ethylene glycol; or (b) at least one copolymer of ethylene glycol and at least one monomer selected from the group consisting of propylene glycol and butylene glycol, in which the proportion of ethylene glycol is at least 70% by weight. Further, polymer (b) may be mixtures of these homopolymers and copolymers. Of course, the mixtures of homopolymers and copolymers may include homopolymers and copolymers of different molecular weight. These homopolymers and copolymers of ethylene glycol possess molecular weights between 1,000 and 50,000, preferably, between 3,000 and 35,000. All these homopolymers and copolymers are both well-known and commercially available.

In the process for the copolymerization of vinyl acetate with the olefin, the protective colloid is formed of 15 to 70% by weight of polymer (a) and 30 to 85% by weight of polymer (b) and is used in an amount of 0.1 to 5%, preferably, 0.5 to 3%, by weight of the monomers to be copolymerized.

The two constituents of the protective colloid are used in the form of aqueous solutions.

The solution of polymer (a) may be used at any time after its preparation; however, according to a preferred form of the invention, the solution of polymer (a) is used immediately after its preparation.

The solution of polymer (a) and the solution of polymer (b) may be introduced separately into the polymerization medium, or polymer (b) may be dissolved in the solution of polymer (a), or polymer (b) may be present during the preparation of polymer (a). The solutions are introduced either all at once before polymerization, or in successive portions or continuously during polymerization.

In the aqueous solution or solutions to be used, polymer (a) plus polymer (b) represent from 0.1 to 15% by weight of the water.

To ensure the stability of the medium for the polymerization of the vinyl acetate and the olefin, and of the latex to be obtained, it may be advantageous to add one or more emulsifiers to the reaction medium. Conventional anionic and/or non-ionic emulsifiers for polymerization in emulsion may be used.

Representative anionic emulsifiers include salts of fatty acids; alkali metal alkylsulfates, alkylsulfonates, alkylarylsulfonates, alkylsulfosuccinates and alkylphosphates; sulfonates of alkylphenol polyglycol ethers; salts of alkylsulfopolycarboxylic acid esters; condensation products of fatty acids with oxyalkanesulfonic and aminoalkanesulfonic acids; sulfated derivatives of polyglycol ethers; sulfated fatty acid esters of polyglycols; and sulfated fatty acid alkanolamides.

Representative non-ionic emulsifiers include fatty acid esters of polyalcohols, fatty acid alkanolamides, polyethylene oxides, ethylene oxide/propylene oxide copolymers, oxyethyleneated alcohols and alkylphenols, and sulfated oxyethyleneated alcohols and alkylphenols.

The amounts of emulsifier(s) to be used are of the order of 0.1 to 3% by weight, relative to the monomers to be copolymerized, and their introduction into the reaction medium may be carried out in total before polymerization, or in part before polymerization, with the other part being added to the reaction medium in successive portions or continuously during polymerization, or, in total in successive fractions or continuously during polymerization, depending on the average particle diameter of the latex to be obtained. According to a particular embodiment of the invention, the emulsifier is added to the medium for the preparation of polymer (a) of the protective colloid.

Depending on the nature of the monomers used, and to prevent hydrolysis of the vinyl acetate/olefin copolymer, it may be advantageous to maintain the polymerization medium at a pH of 3 to 7. This may be achieved by adding a pH regulator to the medium.

Representative pH regulators include a base, such as sodium hydroxide or ammonia, and/or a buffer, such as sodium acetate, sodium bicarbonate or borax. The regulator is added to the medium, by itself or in a mixture, in total before polymerization, or in part before polymerization, with the other part being added in successive portions or continuously during polymerization, or in total in successive portions or continuously during polymerization. More particularly, the pH regulator is added to the medium for the preparation of the polymer (a) of the protective colloid.

The polymerization temperature, which is a function of the initiator used and the polymer to be obtained, is generally between 0° and 95° C., preferably, between 20° and 90° C.

According to a variant, the process described above is carried out in the presence of a seed polymer, which ensures better control over the particle size of the latex to be obtained. This seed polymer can be identical to or different from the copolymer to be obtained. It is obtained by the polymerization, in aqueous emulsion, of vinyl acetate, or of vinyl acetate and an olefin, and/or of the at least one other copolymerizable monomer listed above. The resultant latex of seed polymer may be added to the polymerization medium at the same time as one of the constituents of the protective colloid, or at the same time as the mixture of these two constituents. The seed polymer may also be prepared in the presence of one or both of the constituents of the protective colloid.

Depending on the intended application of the latex of vinyl acetate/olefin copolymer, it is possible to add a plasticizer, before, during or after polymerization, in proportions of between 0 and 20%, preferably, between 0 and 10%, by weight, relative to the copolymer. This plasticizer, which is used by itself or in a mixture, is chosen from amongst the conventional plasticizers and coalescence agents for polyvinyl acetate, such as halogenated or unhalogenated alkyl ($C_4$–$C_6$) phthalates, examples of which are dibutyl, diethyl and trichloroethyl phthalates, ethylene glycol phthalate, adipate and dibenzoate, butylcarbitol acetate, butyl glycolate, glycerol triacetin, dipropyl or diisobutyl succinates, glutarates and adipates, and tricresyl and triphenyl phosphates.

The latices of vinyl acetate/olefin copolymers are used as binders in the manufacture of paints, glues, paper, textiles, particularly non-woven textiles, floor coverings and mortar additives.

Examples of embodiments of the invention, which are merely by way of illustration and in no way limit the scope of the invention, are given below (percentages are by weight):

the viscosity of the latex is measured at 20° C. using a Brookfield RVT viscometer at a speed of 50 rpm;

the particle diameter is measured by electron microscopy;

the glass transition temperature (Tg) of the polymer is measured by differential calorimetric analysis;

the water resistance of the copolymer is determined by placing a drop of demineralized water on a 300 μm film of copolymer obtained by depositing the latex on a transparent glass plate, followed by drying for 2 hours at 50° C. and then for 24 hours at ambient temperature. The water resistance is expressed as the time required for the film to become opaque at the location of the drop of water;

the wet abrasion resistance is measured with the aid of a 6-head abrasion tester under a load of 1,000 g, performing a maximum of 10,000 to-and-from movements (cycles), on a 100 μm film of paint deposited, by a filmograph, on a rigid polyvinyl chloride plate and dried for one week at ambient temperature. The degree of wear is determined after a given number of cycles.

EXAMPLE 1

Preparation of the Colloid

The following are introduced into an autoclave fitted with a stirrer, a condenser and a nitrogen inlet:
1,150 g of deionized water;
7 g of acrylamide;
12 g of a 60% strength aqueous solution of N-methylolacrylamide;
9.5 g of sodium acetate;
168.5 g of a 24% strength aqueous solution of sodium tetradecylsulfonate;
19 g of polyethylene glycol of molecular weight 10,000.

The air is removed by introducing a stream of nitrogen. The stream of nitrogen is maintained, and the mixture is stirred. After dissolution, the solution is heated to and maintained at 60° C.

As soon as the mixture has reached 60° C., a solution of 0.75 g of ammonium persulfate in 50 cm³ of water is introduced. After a reaction time of 1 hour, the reaction mixture is cooled and the nitrogen stream is stopped.

Polymerization

After the air and nitrogen have been evacuated from the autoclave by drawing a vacuum, the following are introduced:
237.5 g of isobutene, and then
380 g of vinyl acetate.

The reaction mixture is heated to and maintained at 80° C. throughout the reaction. 9.5 g of potassium persulfate in 200 cm³ of water are introduced.

After one hour, the following are introduced simultaneously and continuously:
1,282.5 g of vinyl acetate at a constant rate over 5 hours;
a solution of 19 g of potassium persulfate in 200 cm³ of water, at a constant rate over 7 hours.

2 hours after the continuous introduction of potassium persulfate has ended, the reaction mixture is cooled.

A latex of 87/13 vinyl acetate/isobutene copolymer is obtained, having the following characteristics:

| | |
|---|---|
| pH | 2.7 |
| viscosity | 350 mPa · s |
| concentration | 49.5% |
| particle diameter | 0.2–0.5 μm |
| Tg of the copolymer | 21° C. |
| water resistance | 13 minutes |

By comparison, an 87/13 vinyl acetate/isobutene copolymer prepared by polymerization in emulsion in the presence of an amount of hydroxyethylcellulose equal to that of the protective colloid of Example 1 possesses a water resistance of only 2 minutes.

The latex is brought to pH 9 by adding ammonia; its viscosity reaches 4,000 mPa.s after 10 hours and stabilizes.

Application

The latex obtained is used to prepare a paint by adding a pigment paste and ammonia to give a pigment concentration by volume (PCV) of 76% and a pH of 8.5.

The wet abrasion resistance is determined on the paint obtained and compared below to the wet abrasion resistance of a paint having the same PCV and prepared with a latex of an 87/13 vinyl acetate/isobutene copolymer containing an amount of hydroxyethylcellulose equal to that of the protective colloid of Example 1.

The results reported below demonstrate the superior wet abrasion resistance of the paint prepared by using the latex of the present invention:

| Degree of Wear | Example 1 | Comparison Experiment |
|---|---|---|
| After 250 cycles | 0% | 10% |
| After 1,000 cycles | 0% | 50% |
| After 10,000 cycles | 0% | 100% |

EXAMPLE 2

Preparation of the Colloid

The following are introduced into an autoclave fitted with a stirrer and resistant to a pressure of 50 bars:
770 g of deionized water;
5.5 g of sodium acetate;

4 g of sodium tetradecylsulfonate in a 25% strength aqueous solution;
7.5 g of acrylamide;
7.5 g of N-methylolacrylamide in a 60% strength aqueous solution;
19 g of polyethylene glycol of molecular weight 10,000.

The air is removed by introducing a stream of nitrogen. While the stream of nitrogen is maintained, the mixture is stirred. After total dissolution, the solution is heated to and maintained at 60° C. As soon as the mixture has reached 60° C., a solution of 0.8 g of ammonium persulfate in 50 cm³ of water is introduced. After 1 hour, the stream of nitrogen is stopped.

Polymerization 2.5 g of potassium persulfate in 50 cm³ of water are introduced into the reactor.

After all air and nitrogen in the reactor have been evacuated by drawing a vacuum, the following are introduced simultaneously and continuously:
1,240 g of vinyl acetate at a constant rate over 5 hours;
ethylene under a constant pressure of 30 bars (constant pressure is maintained throughout the introduction of ethylene);
a solution of 6.2 g of potassium persulfate in 200 cm³ of water, at a constant rate over 5 hours.

15 minutes after the simultaneous introduction of vinyl acetate, ethylene and potassium persulfate solution have begun, the reaction mixture is heated to and maintained at 80° C.

30 minutes after the beginning of the simultaneous introduction, the continuous introduction of 4 g of sodium tetradecylsulfonate in 200 cm³ of water is started at a constant rate of 57 cm³/hour.

3 hours, 30 minutes after the beginning of the simultaneous introduction, the introduction of ethylene is stopped.

6 hours after the beginning of the simultaneous introduction, the reaction mixture is cooled.

A latex of an 85/15 vinyl acetate/ethylene copolymer is obtained having the following characteristics:

| pH | 4.5 |
| viscosity | 900 mPa · s |
| concentration | 54% |
| particle diameter | 0.3–0.6 μm |
| Tg of the copolymer | 0° C. |

The latex is brought to pH 9 by adding ammonia. The viscosity of the latex reaches 6,000 mPa.s after 10 hours and stabilizes. If the pH of the latex is brought to 4 by adding acetic acid, the viscosity is not substantially modified and stabilizes at 5,800 mPa.s.

EXAMPLE 3

A latex of vinyl acetate/ethylene copolymer is prepared as outlined in Example 2.

The stirred latex is heated to and maintained at 60° C. The following are introduced simultaneously and continuously into the stirred latex:
387 g of vinyl chloride at a constant rate over 3 hours;
a solution of 4 g of ammonium persulfate in 200 cm³ of water, at a constant rate over 4 hours;
a solution of 4 g of sodium metabisulfite in 200 cm³ of water, at a constant rate over 4 hours;
a solution of 2 g of sodium tetradecylsulfonate in 200 cm³ of water, at a constant rate over 4 hours.

3 hours after the introduction of the vinyl chloride has ended, the mixture is cooled.

A latex of 67.5/11.5/21 vinyl acetate/ethylene/grafted vinyl chloride copolymer is obtained, having the following characteristics:

| pH | 4.3 |
| viscosity | 500 mPa · s |
| concentration | 51.2% |
| particle diameter | 0.4–0.7 μm |
| Tg of the graft copolymer | 10° C. |

Part of the latex is brought to pH 9 by adding ammonia. The viscosity of this part of the latex is 4,000 mPa.s after 24 hours and stabilizes.

The other part of the latex is also brought to pH 9 by adding ammonia. The viscosity of this other part of the latex is 1,900 mPa.s after 5 hours. The addition of acetic acid to give a pH of 4.5 stops the increase in the viscosity, which stabilizes at 1,800 mPa.s.

EXAMPLE 4

Preparation of the Colloid

The following are introduced into a reactor fitted with a condenser, a nitrogen inlet and a stirrer:
2,580 g of deionized water;
33.75 g of acrylamide;
56.25 g of a 60% strength aqueous solution of N-methylolacrylamide;
27 g of sodium acetate;
75 g of a 30% strength solution of sodium tetradecylsulfonate;
90 g of polyethylene glycol of molecular weight 10,000.

The air is removed by passage of a stream of nitrogen, which stream is maintained during the preparation of the colloid. The mixture is stirred.

After dissolution, the solution is heated to and maintained at 60° C.

As soon as the solution has reached 60° C., 3.5 g of ammonium persulfate in 100 cm³ of water are introduced.

After a reaction time of 1 hour, the nitrogen stream is stopped.

Preparation of a Seed 4 g of ammonium persulfate and 225 g of ethyl acrylate are added to the colloid solution.

After 20 minutes, the reaction medium is heated to 80° C., kept at this temperature for 1 hour and then cooled to ambient temperature.

Polymerization

After evacuation of the reactor, the following are introduced successively:
650 g of the seed-colloid solution prepared above;
980 g of deionized water;
7 g of laurylmercaptan.

The mixture is stirred and heated to and maintained throughout the reaction at 80° C.

As soon as the mixture has reached 80° C., a solution of 5 g of potassium persulfate in 50 cm³ of water is added thereto. The following are then introduced simultaneously at a constant rate:
190 g of isobutene over 1 hour;
19 g of potassium persulfate in 200 cm³ of water, over 2 hours 45 minutes;

a mixture of 1.520 g of vinyl acetate and 190 g of "Versatate VEOVA 10", over 3 hours.

"Versatate VEOVA 10" is a mixture of vinyl esters of branched $C_9$ to $C_{11}$ monocarboxylic acids.

Two hours after the introduction of vinyl acetate and "Versatate VEOVA 10" has ended, the reaction mixture is cooled.

A latex of a 78/9.75/9.75/2.5 vinyl acetate/isobutene/"Versatate"/ethyl acrylate copolymer is obtained, having the following characteristics:

| | |
|---|---|
| pH | 2.7 |
| viscosity | 700 mPa · s |
| concentration | 53% |
| particle diameter | 0.1–0.4 μm |
| Tg of the polymer | 17° C. |
| water resistance | 20 minutes |

The pH of the latex is brought to 9 by adding ammonia. The viscosity of the latex reaches 4,000 mPa.s after 10 hours and stabilizes.

What is claimed is:

1. A latex of a vinyl acetate/olefin copolymer comprising:

particles of a vinyl acetate/olefin copolymer, said copolymer having a glass transition temperature between −30° and 50° C. and said particles being present in said latex in a concentration between 10 and 70% by weight and having an average diameter between 0.05 and 1 μm; and a protective colloid, said colloid consisting essentially of a water-soluble polymer (a) containing at least one monomer selected from the group consisting of N-methylolacrylamide and N-methylolmethacrylamide and a water-soluble polymer (b) of ethylene glycol, said polymer having a molecular weight between 1,000 and 50,000, said latex having a first viscosity at acid pH, said first viscosity being lower than a second viscosity obtained when the pH of said latex is made alkaline and wherein said second viscosity remains invariable irrespective of subsequent changes in the pH of said latex.

2. The latex of claim 1, wherein said copolymer is a copolymer of vinyl acetate with at least one olefin possessing 2 to 4 carbon atoms.

3. The latex of claim 2, wherein said copolymer includes at least one other copolymerizable monomer selected from the group consisting of (a) vinyl esters of branched or unbranched, saturated monocarboxylic acids ($C_1$–$C_{12}$), (b) alkyl ($C_1$–$C_{10}$) esters of unsaturated monocarboxylic or dicarboxylic acids ($C_3$–$C_6$), (c) vinyl halides and (d) vinylidene halides.

4. The latex of claim 1, wherein the polymer (a) is selected from the group consisting of (a) at least one homopolymer containing a monomer selected from the group consisting of N-methylolacrylamide and N-methylolmethacrylamide, (b) at least one copolymer of N-methylolacrylamide and N-methylolmethacrylamide, (c) at least one copolymer containing at least one monomer selected from the group consisting of N-methylolacrylamide and N-methylolmethacrylamide and further containing at least one monomer selected from the group consisting of acrylamide, methacrylamide, N-alkyl ($C_1$–$C_4$) derivatives of either acrylamide or methacrylamide, said N-alkyl ($C_1$–$C_4$) derivatives being unsubstituted or substituted by amine or alkoxy ($C_1$–$C_4$) groups, and N-alkyl ($C_2$–$C_4$) derivatives of either acrylamide or methacrylamide, said N-alkyl ($C_2$–$C_4$) derivatives being substituted by a hydroxyl group, and (d) a mixture thereof.

5. The latex of claim 1 wherein the polymer (b) of ethylene glycol is selected from the group consisting of (a) at least one homopolymer of ethylene glycol, (b) at least one copolymer of ethylene glycol and at least one monomer selected from the group consisting of propylene glycol and butylene glycol, wherein the proportion of ethylene glycol in said copolymer is more than 70% by weight, and (c) a mixture thereof.

6. The latex of claim 1, wherein said colloid is present in an amount of 0.1 to 5% by weight, relative to the copolymer, and further wherein said protective colloid is formed of 15 to 70% by weight of said polymer (a) and 30 to 85% by weight of said polymer (b) of ethylene glycol.

* * * * *